United States Patent [19]
Stimpson

[11] 3,881,592
[45] May 6, 1975

[54] MODULAR BAGGAGE HANDLING SYSTEM WITH CHAIN DRIVE

[75] Inventor: Jack E. Stimpson, Plain City, Utah

[73] Assignee: Stanray Corporation, Chicago, Ill.

[22] Filed: July 10, 1074

[21] Appl. No.: 487,040

Related U.S. Application Data

[63] Continuation of Ser. No. 319,622, Dec. 29, 1972, abandoned.

[52] U.S. Cl................................. 198/181; 198/195
[51] Int. Cl............................................ B65g 17/00
[58] Field of Search ........... 198/181, 203, 129, 195, 198/189

[56] References Cited
UNITED STATES PATENTS
3,677,388  7/1972  Boltrek et al...................... 198/203
3,718,249  2/1973  Hess................................... 198/181

Primary Examiner—Evon C. Blunk
Assistant Examiner—Joseph E. Valenza
Attorney, Agent, or Firm—Robert E. Wagner; Robert E. Browne

[57] ABSTRACT

A baggage handling system primarily for airports consisting of a continuous train of wheeled modular carriers which follow a predetermined path created by guide rails which bear against guide wheels mounted on the wheel assemblies. The train is driven by a motor operatively connected to a continuous chain drive assembly which engages chain dogs affixed to each modular carrier.

6 Claims, 12 Drawing Figures

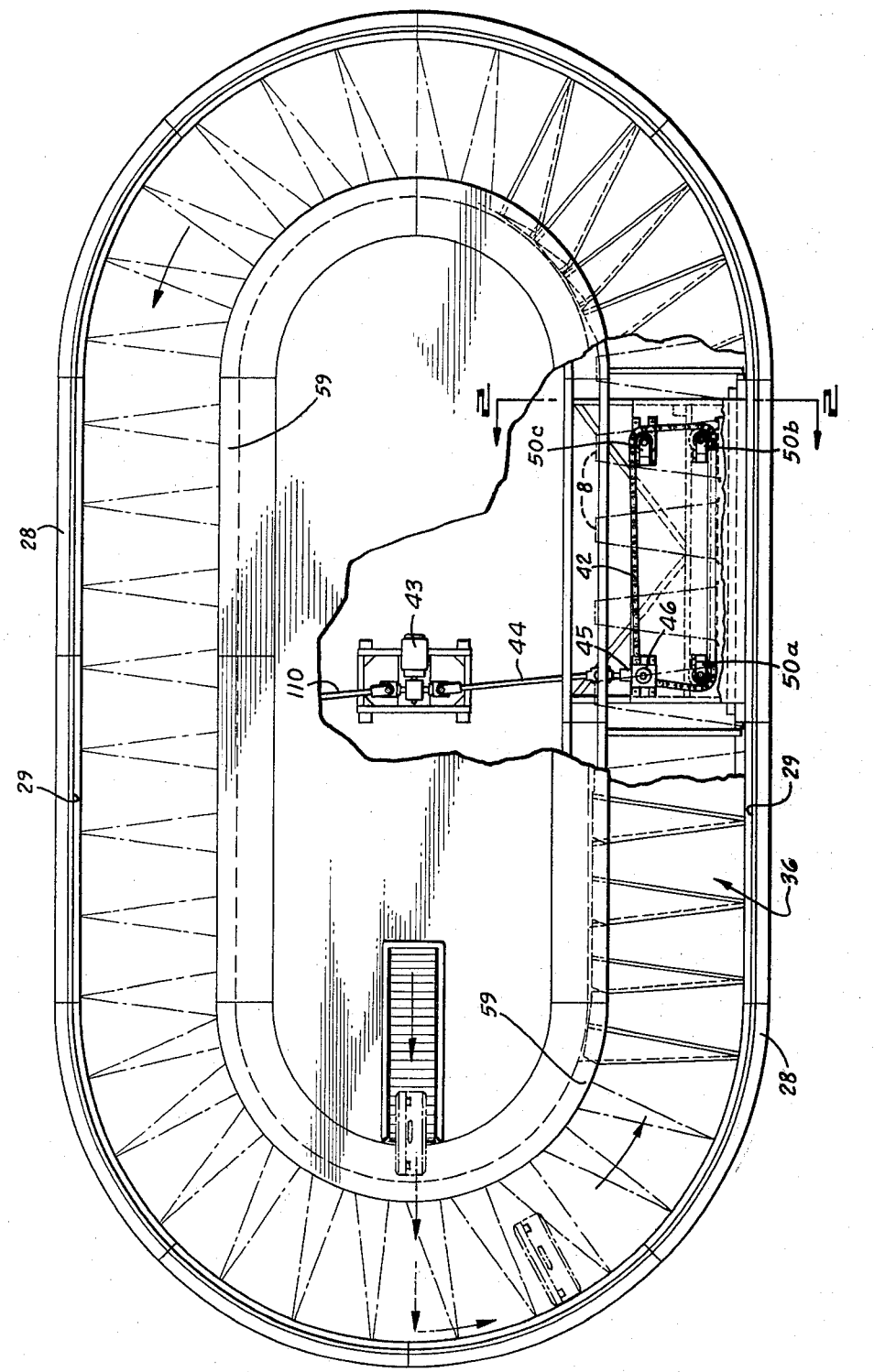

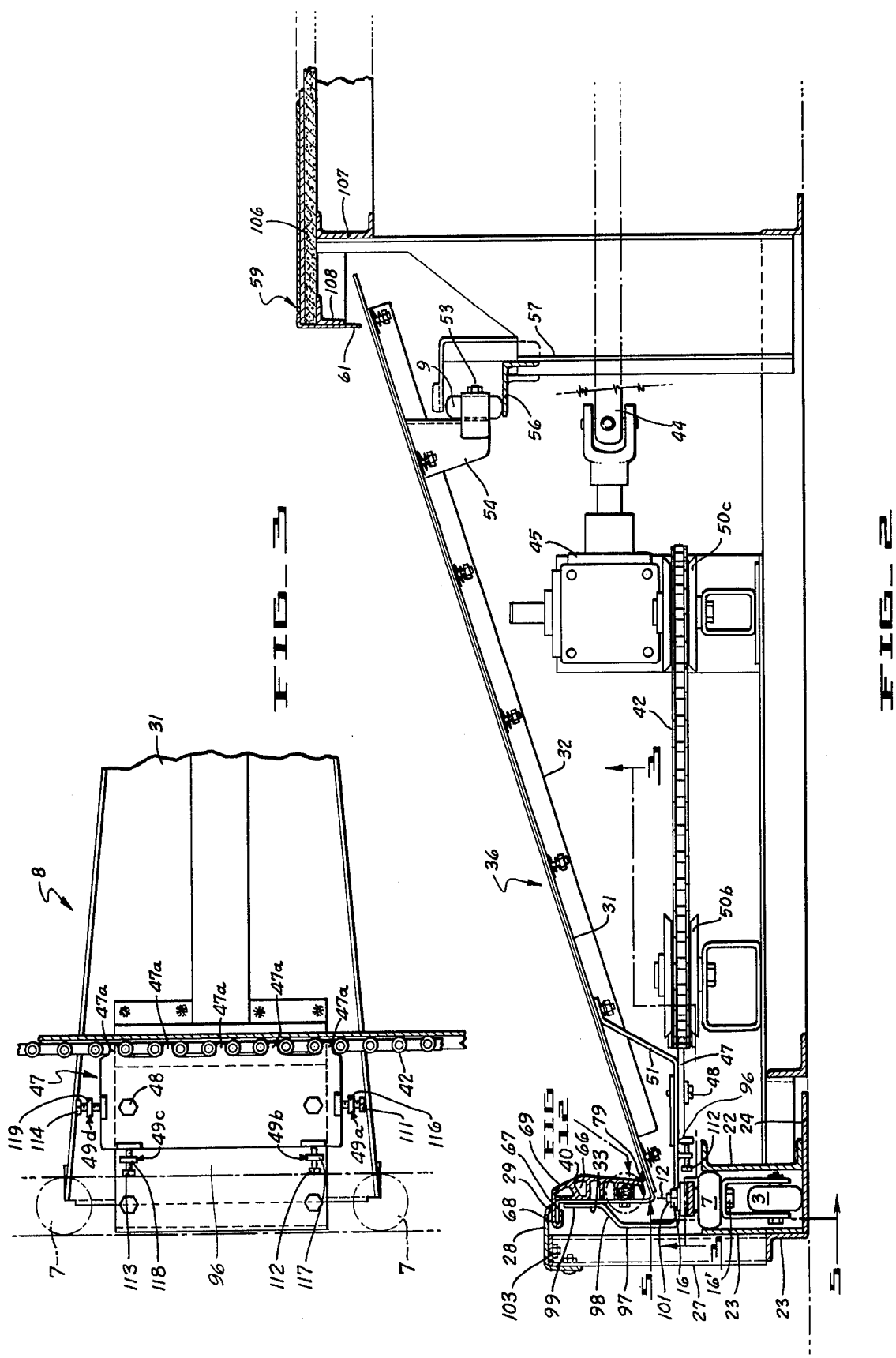

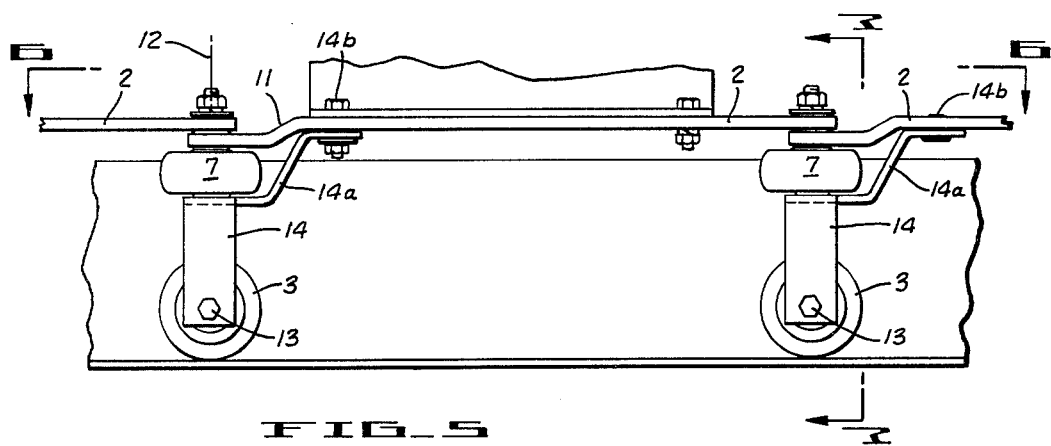
FIG_5
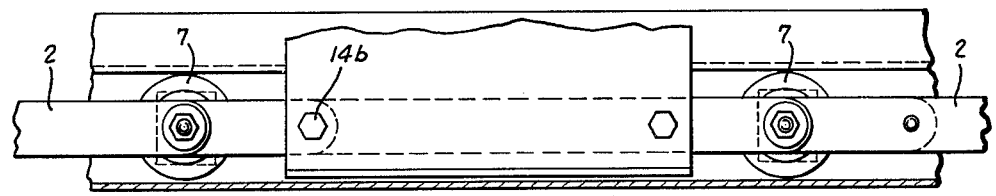
FIG_6
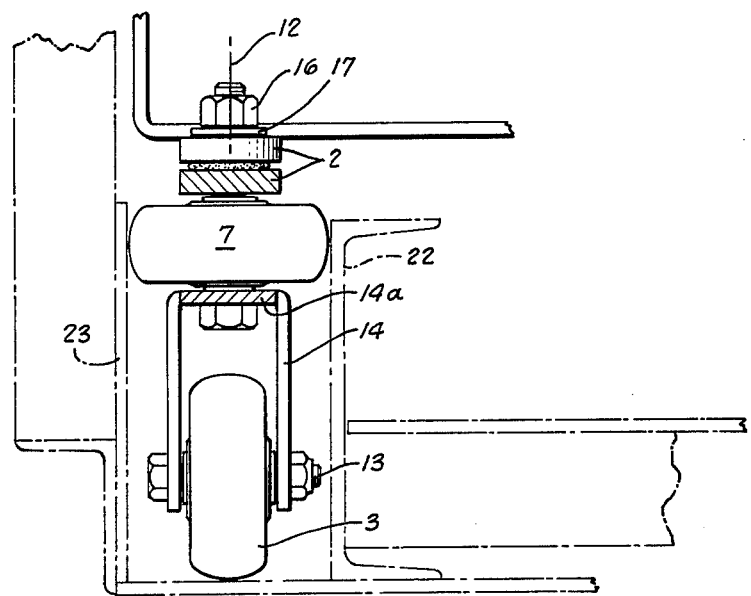
FIG_7

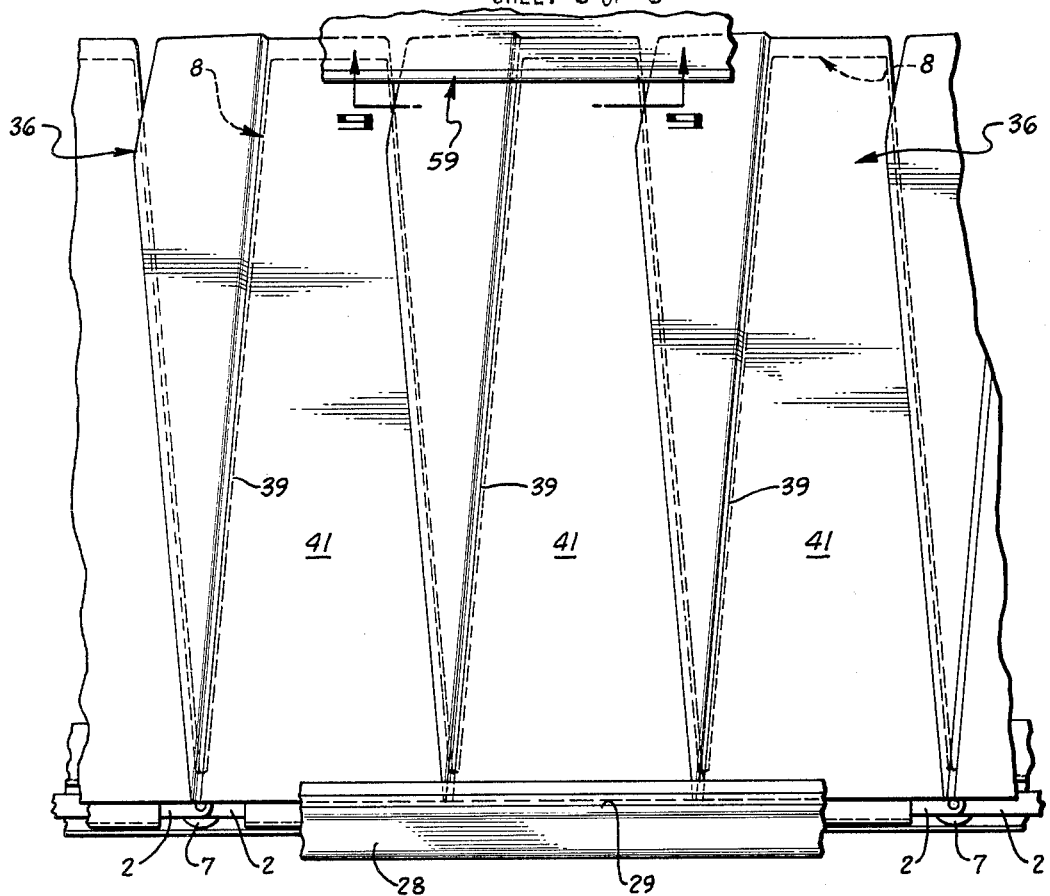
FIG_8
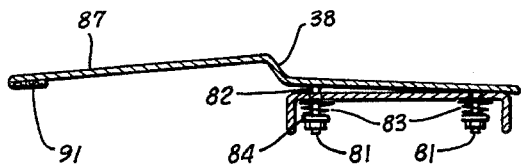
FIG_9
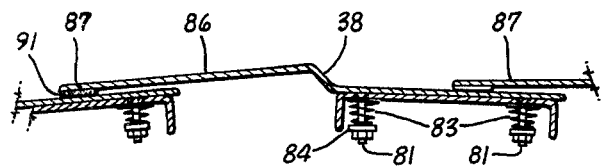
FIG_10
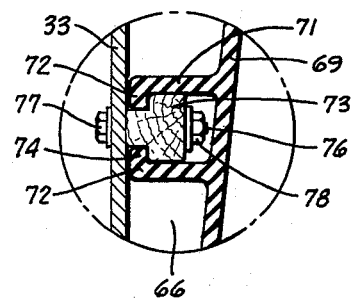
FIG_12
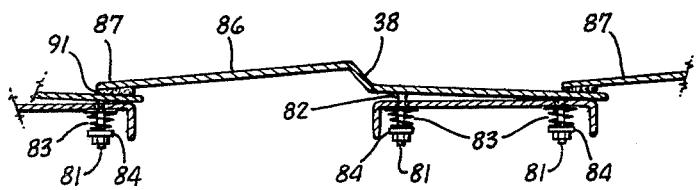
FIG_11

MODULAR BAGGAGE HANDLING SYSTEM WITH CHAIN DRIVE

This is a continuation of application Ser. No. 319,622, filed Dec. 29, 1972, now abandoned.

SUMMARY OF THE INVENTION

This invention is an improvement of baggage carousels described in U.S. Ser. No. 133,220, filed Apr. 12, 1971, now U.S. Pat. No. 3,718,249, issued Feb. 27, 1973, and assigned to the assignee of the present invention.

The improvement of the present invention is the use of a chain drive assembly to drive the modular carriers.

An object of the present invention is to reduce the manufacturing costs of the drive mechanism and to improve the operability of the system.

Another object is to provide a drive mechanism in which it is easier to synchronize two drives powered by the same motor.

BRIEF DESCRIPTION OF THE DRAWINGS

FIG. 1 is a plan view of the system of the present invention with portions removed in order to more clearly show the drive system which is claimed in this invention.

FIG. 2 is a side elevation view of the carrier modular assembly and the chain drive assembly taken generally along line 2—2 of FIG. 1.

FIG. 3 is a bottom plan view of a portion of the carrier and chain as taken generally along the line 3—3 of FIG. 2.

FIG. 5 is an enlarged elevation view of the device taken generally along the line 5—5 in FIG. 2.

FIG. 6 is a plan view of a portion of the device taken generally along the line 6—6 in FIG. 6.

FIG. 7 is an enlarged elevation view of a portion of the caster assembly taken generally along line 7—7 of FIG. 5.

FIG. 8 is a plan view of a portion of the system particularly showing the steel sheets attached to the carriers.

FIG. 9 is a cross section of a plate taken generally along line 9—9 of FIG. 8.

FIG. 10 is a cross section of a plate with portions of two other plates and their relationship in a turn.

FIG. 11 is a cross section of a plate with portions of two other plates and their relationship along the straight portions of the system.

FIG. 12 is an enlarged section of the bumper attachment means taken along the line 12—12 of FIG. 2.

DESCRIPTION OF THE PREFERRED EMBODIMENTS

Figure 4:
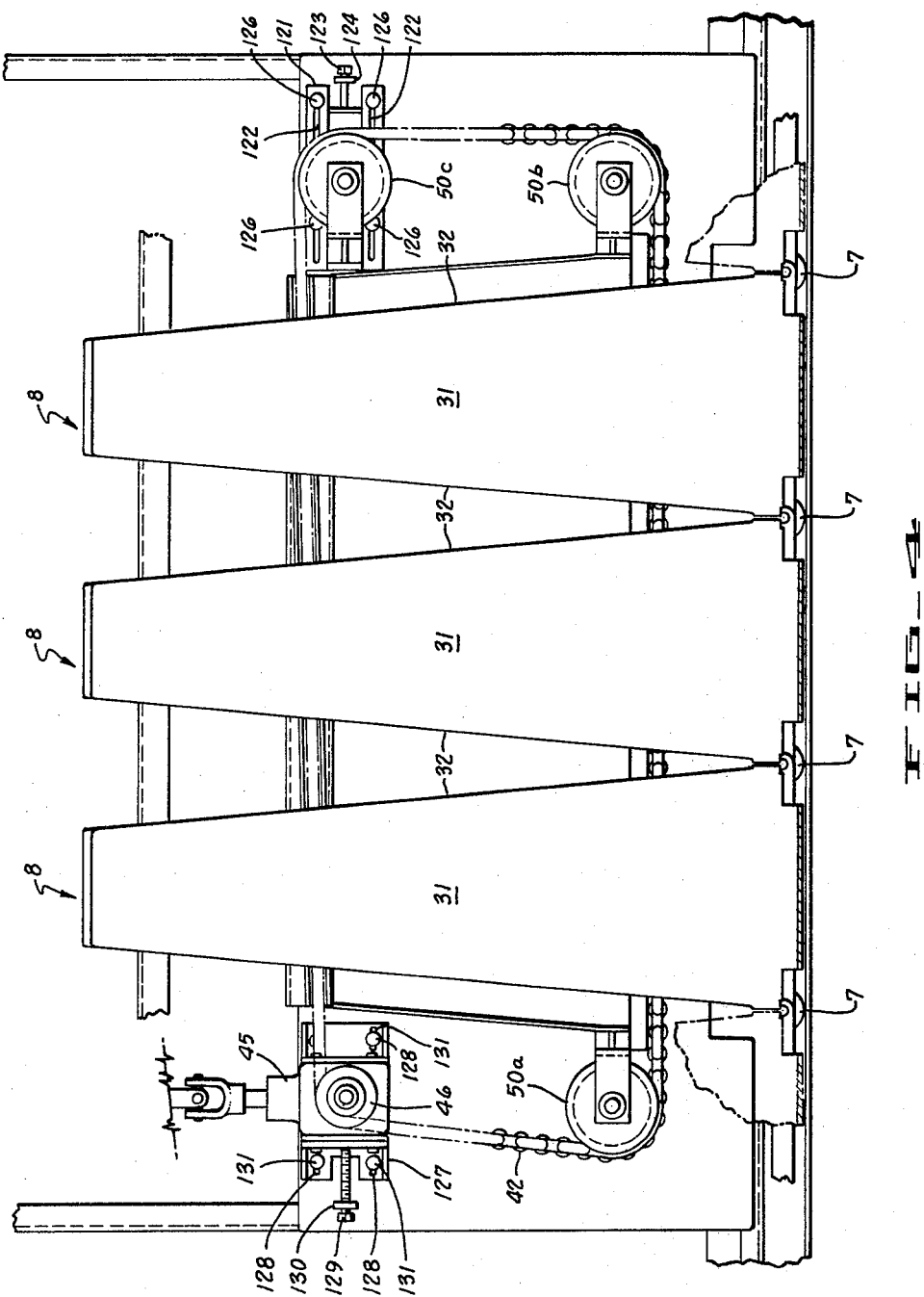
FIG. 4 is an enlarged elevation view of a portion of the drive assembly which is exposed in FIG. 1 by the removal of portions of the assembly.

The modular baggage handling system of the present invention consists briefly of a continuous train of wheeled carriers forming a chain mounted in a plane having elongated links 2; load wheels 3 connected to the links for supporting the carriers; guide rail means defining the configuration of the chain; guide wheels 7 mounted on the chain in rolling contact with the guide rail means; a pallet carrier having a base 8 mounted on the chain links and having a load carrier wheel 9 mounted thereon spaced from the load wheel; drive means; and drive engaging means operably connecting the drive means and chain for propelling the system.

Each link in the chain of modular carriers consists of a metal bar having a length sufficient to receive one carrier and to span the distance between load supports. Each link at its leading end may be formed with a bend 11 as shown in FIG. 5. Each of the vertical axes of the wheel brackets and the axes of the horizontally mounted guide wheels are preferably mounted on a common axis 12 at the pivotal connection of each of the chain links. This arrangement eliminates costly initial alignment and adjustments in aligning the guide wheels load wheels and connections between links. As shown in FIGS. 5 and 7 the wheels are rotatably mounted on axles 13 journaled in vertical arms 14 which are pivotal about the previously mentioned vertical axis. Guidance of the wheels is effected by attaching a tongue 14a rigidly to the vertical arm 14 and pivotally and forwardly at point 14b on link 2. The tires of the wheels preferably are polyurethane to insure long wear. Each wheel bracket has a vertical stub axle on which is freely rotatably mounted a guide wheel. A leading and a trailing link is pivotally mounted on the axle and the assembly is secured by threading nut 16 on a threaded end of the axle with a suitable lock washer 17.

The guide rail means may be an elongated supported member which contacts the guide wheels. An inner rail 22 is essential but it has been found desirable to add an outer rail 23 along the straight track portions of the modular baggage handling system. As shown in FIG. 2 the guide means includes a plate 24 which supports the load bearing wheels and angle 26 supports a metal guard sheet 27 and a rubber or plastic shield 28 having a lip 29 extending in close proximity to the carrying means.

The pallet carrier base consists of a trapezoidal sheet metal member 31 having flanged edges 32 for stiffness and an upturned vertical flange 33 at its lower end. Various size units can be employed.

Plate numbers, which are preferably stainless steel sheets 36, are attached to the carrier by fasteners such as Nelson studwelds 81. The shape of the carriers and the sheets are determined by the radius of the sharpest curve in the unit. As shown in FIG. 1 the slope of the sides of the carriers must be such that they just barely touch when traversing a bend. The stainless steel sheets are designed with their trailing edges approximately parallel to the leaning edge of the carrier with slight overlapping thereof at the straight portions so that the stainless steel sheets will be supported at their trailing edges.

Since the stainless steel sheets necessarily slide over one another at the turns, it is essential to keep the overlapping edges in contact with the lower sheets at all times. This is accomplished by placing an off set bend 38 in each of the stainless sheets along a line 39 running the length of the sheet as shown in FIG. 8. As can be seen in the curved portion of the unit in FIG. 1, the "wiped" area does not overlap the spring bend. As shown in FIG. 8, the trailing portion 41 of the sheet is bent downwardly and with the operation of the short radius bend acting as a spring, the sheets stay in contact with one another.

A continuous rubber bumper 40 is attached to the flange at the lower end of the carrier and cushions the shock as the baggage slides down the inclined carrier surface. The bumper is more fully described below.

The drive means is a roller chain 42 driven by an electric motor 43 through a speed reducer and a drive shaft 44, a right angle drive 45 to a chain sprocket 46. The horsepower of the motor and the reducer are determined by the length of the unit, the driven speed and the design loads. The chain drive gives a conveyor speed of about 100 feet per minute. A design loading of the present conveyor is 50 pounds per square foot. Speeds of 150 feet per minute are easily obtained.

The chain 42 engages three or more chain dogs 47 having teeth 47a. The chain dogs are 1 foot 6 inches long and are adjustably mounted by bolts 48 to a plate member 51 attached to the underside of the carrier and to a chain link 2. Fine adjustment of the chain dog may be effected by turning adjusting means 49a, 49b, 49c and 49d. The drive chain is supported by idler sheaves 50a, 50b and 50c.

The upper end of the carrier is supported by a load wheel which freely rotates on axis 53 journaled in bracket 54 which is attached to the underside of the carrier. The upper wheel is fitted with a polyurethane tire or other long lasting material and rides on rail 56 which is elevated above the lower wheel so that the carrier slopes to the outer rail. The rail is here supported on plate 57. A plate 58 supports an upper guard 59 which carries a flexible wiper 61 to prevent contact with the upper ends of the stainless steel sheets.

The units must have a straight section when using the chain drive as a drive means which is at least the distance between at least two and preferably three chain dogs.

Referring to FIG. 2 the bumper member 40 is constructed from a resilient material such as rubber and completely shields the metal flanges of each pallet carrier in a continuous strip which is co-extensive in length with the modular carrier chain. The bumper moves with the carriers and spans the distance therebetween so that even the smallest package will not slip between the carriers and become enmeshed in the mechanism. Since the bumper is movable rather than stationary, there is no possibility of the baggage or other articles being tumbled by catching between the movable carriers and any stationary supporting structure.

As shown specifically in FIGS. 2 and 12, the bumper is formed with cavities 66 to decrease the weight and provide for greater ability to absorb impact of articles sliding down the stainless steel plates.

Flange 33 is formed with a horizontal lip 67 and the bumper extends over and around this lip as shown by curved portion 68. The main portion of the bumper is actually constructed of a relatively thin member 69 with protruding legs 71 and flanged feet 72. The bumper is attached to the metal flange by means of a shaped member 73 which extends between the legs 71 of the bumper and shoulders 74 hold the flanges of the bumper feet in close contact with the metal flange. A threaded bolt 76 extends through the shaped member and the metal flange and threaded nuts 77 and 78 hold the assembly in place. The bumper is located in line with the pivotal axis of the caster assembly and therefore there is very little stretching of the bumper or relative movement between the bumper and the carriers. The bumper tends to dampen out any noise in the carriers and to serve as a shock absorber therebetween for any relative movement. The bumper, hence, is an integral portion of the entire system rather than merely a bumper against which the baggage impacts. Note that the bumper extends the entire height of the flange and ends in an extension member 79 in contact with the carrier plates.

A major feature of the present invention is the method of attachment of the stainless steel plates to the base of the carrier. As earlier noted, the plates overlap one another and since the plates are formed with an offset bend 38, the free portions of the plates move toward and away from the base of the carrier as each plate moves around turns and proceeds to the straight portions. To prevent failure of the welds between the studs 81 and the carrier plates, at the point of the weld 82, the studs extend through an opening in the base and a spring 83 is placed around the stud and positioned between the base and a retainer nut 84 connected to the free end of the stud. The spring biases the plate towards the base at all times. FIG. 10 shows the carrier going around a turn. In this position, the overlapping portion 86 is substantially parallel to the base of the adjacent overlapped carrier and the springs are in a relatively uncompressed position. Note that the springs are not relaxed, but are still compressed sufficiently to continue to pull the plate toward the base to prevent separation of the plates one from another as at edge portion 87 as shown in FIG. 10.

As shown in FIG. 11, the plates are in their relative positions as they would appear in the straight portions of the system. Note that the springs are fully compressed, leaving some reserve for alignment, and a space has opened up between the base and the plates. Again, as may be seen in FIG. 11, there is no opening at edge 87 between the plates in the straight sections of the system.

As may be seen in FIGS. 10 and 11, the overlapping portions of the plate are not parallel to the portions covering the base but are bent at a slight angle. The angle is roughly equal to the angle made by adjoining carriers when in the tightest bend so that the overlapping portions are approximately parallel as shown in FIG. 10.

To prevent chaffing of the stainless steel plates at the point of overlap, a strip of rubber or other resilient material 91 may be placed therebetween. The strip also insures quiet operation of the system as the plates move around turns or as loads come upon the plates.

The use of a continuous bumper which is coextensive with the length of the chain and circumference of the system is made possible by the unique combination of the construction of the carrier pallets and the placement of the load carrying assemblies.

Referring to FIG. 2, it may be seen that the flange 33 of the pallet carriers are in alignment with the vertical axis of the load wheel assembly. Thus, as the carriers swing around the turns in the system, there is a minimum of separation between the edges of adjacent carriers at the flange areas where the continuous rubber bumper is riding.

Referring to FIG. 2, the carrier pallet is constructed with plate member 51 being attached to the underside of the carrier base and extending outwardly and through the axis 12 by portion 96 and then is attached to the flange 33 by upright member 97 which angles inwardly at portion 98 and is attached at area 99 to the flange 33.

The wheel assembly is attached to the carrier as shown in FIG. 2. The vertical axle 101 of the wheel assembly which is located on axis 12, extends through portion 96 of the carrier angle assembly and is attached thereto by lock nuts 16 and 16'.

The construction of the guard rail surrounding the system is shown in FIG. 1. Angle 103 connected to the upright member 27 holds the rubber shield 28 just above the top of the rubber bumper to prevent direct contact with the moving bumper.

The shield structure at the inner portion of the system is shown in FIG. 2 and consists of a horizontal member 106 which can be constructed from plywood and covered with a stainless steel member such as member 59. The member 106 is connected to the upright member 58 as by a channel 107. The flexible wiper 61 is connected to member 59 by an angle 108.

As stated above, an advantage of the use of a chain drive system is the precision by which the parts can be made and assembled. This makes possible the synchronization of two chain drives using a single motor. As shown in FIG. 1, the single motor 43 powers drive shaft 44 and a second drive shaft 110. The second chain drive system would be identical to the chain drive described and is not repeated.

As may be understood, placement of the chain dogs in precision alignment with the openings in the chain is essential to a smooth operating system. To accomplish adjustment, the chain dog is formed with oversize openings so that the chain dog can move in relation to member 96. To adjust, bolts 48 in the oversized openings are loosened and nuts 111, 112, 113, and 114 are turned as required. Threaded nuts 116, 117, 118, and 119 are attached to the portion 96 of plate 51.

Referring to FIG. 4, the means for adjusting the slack in the chain is shown and consists of a plate member 121 with slots 122. Adjusting bolt 123 and threaded nut 124 provide the fine adjustment and when properly adjusted, the bolts 126 are tightened. A similar arrangement for adjustment is used for the drive 45 and consists of a plate 127 with slots 128, adjustment bolt 129, nut 130 and holdown bolts 131.

I claim:

1. A modular baggage handling system comprising:
   a. a continuous chain mounted in a plane having elongated links;
   b. a guide rail means having substantially vertical flanges defining the configuration of said chain;
   c. a plurality of load wheel assemblies each having a substantially vertical stub axle connected to one of said links, a first load carrying wheel coaxially pivotable about the axis of said stub axle, and a guide wheel rotatably mounted on said stub axle in rolling contact with said guide rail flanges;
   d. a plurality of pallet carriers mounted on said links, each having a load carrying base positioned at an inclined angle and a substantially vertical flange at the extreme lower end of said base, a bracket connected to said load carrying base, and a second load carrying wheel mounted for rotation at the upper end of said pallet carrier on an elevated track;
   e. said first load carrying wheel, said stub axle and said vertical flange of each of said pallet carriers being substantially in vertical alignment to insure negligible separation of said pallets in the plane of said vertical flanges;
   f. drive means including at least a first drive chain member;
   g. means associated with each of said pallet carriers for engaging said drive chain member, said means being adjustable relative to said each of said pallet carriers for alignment with said drive chain member, each of said means including a chain dog member independently mounted on each pallet carrier and disposed to engage a portion of said drive chain member such that movement of said drive chain member will impart corresponding movement to each pallet carrier thereby operatively engaged, such that each pallet carrier will be moved relative to said guide rail means;
   h. a continuous flexible bumper member coextensive in length with said continuous chain, connected to and substantially covering said pallet carrier flange and spanning the distance between said pallet carriers;
   i. sheet plate members mounted on each of said load carrying bases providing a surface overlapping said pallet carriers and adjacent plates for providing a continuous surface for receiving baggage and other articles;
   j. each of said sheet plate members carrying a resilient strip on its overlapping edge to prevent galling of the plate surfaces which come in overlapping rubbing contact; and
   k. resilient means connecting said plate members to said pallet carriers to permit limited relative movement in a direction normal to the plane of said pallet base members.

2. A baggage system as described in claim 1 wherein:
   a. said plate members are made from metal and are formed with an offset along a line running the length of the sheet to form a bind line.

3. A baggage system as described in claim 2 comprising:
   a. said resilient means comprising a rivet welded to said plate member and extending through an opening in said base of said pallet carrier, and a spring positioned between said pallet base and a retainer connected to the free end of said rivet and biasing said plate toward said pallet base.

4. A modular baggage handling system comprising:
   a. a continuous chain mounted in a plane having elongated links;
   b. a guide rail means having substantially vertical flanges defining the configuration of said chain;
   c. a plurality of load wheel assemblies each having a substantially vertical stub axle connected to one of said links, a first load carrying wheel coaxially pivotable about the axis of said stub axle, and a guide wheel rotatably mounted on said stub axle in rolling contact with said guide rail flanges;
   d. a plurality of pallet carriers mounted on said links, each having a load carrying base positioned at an inclined angle and a substantially vertical flange at the extreme lower end of said base, a bracket connected to said load carrying base, and a second load carrying wheel mounted for rotation at the upper end of said pallet carrier on an elavated track;
   e. said first load carrying wheel, said stub axle and said vertical flange of each of said pallet carriers being substantially in vertical alignment to insure negligible separation of said pallets in the plane of said vertical flanges;

f. drive means including at least a first drive chain member;
g. means associated with each of said pallet carriers for engaging said drive chain member, each of said means including a chain dog member independently mounted on each pallet carrier and disposed to engage a portion of said drive chain member such that movement of said drive chain member will impart corresponding movement to each pallet carrier thereby operatively engaged, such that each pallet carrier will be moved relative to said guide rail means;
h. each of said chain dog members including a plate having a plurality of teeth for engaging said drive chain member and spaced enlarged openings formed therein for receiving means for mounting said plate on each pallet carrier, the dimension of said enlarged openings permitting relative selective movement between said chain dog member and said associated pallet carrier;
i. adjusting means mounted on each of said pallet carriers and operatively engaging said associated chain dog member to allow for precision adjustment of said chain dog member relative to said pallet carrier to provide precise normal and parallel alignment of said chain dog member with said drive chain member;
j. a continuous flexible bumper member coextensive in length with said continuous chain, connected to and substantially covering said pallet carrier flange and spanning the distance between said pallet carriers;
k. sheet plate members mounted on each of said load carrying bases providing a surface overlapping said pallet carriers and adjacent plates for providing a continuous surface for receiving baggage and other articles;
l. each of said sheet plate members carrying a resilient strip on its overlapping edge to prevent galling of the plate surfaces which come in overlapping rubbing contact;
m. resilient means connecting said plate members to said pallet carriers to permit limited relative movement in a direction normal to the plane of said pallet base members.

5. A baggage system as described in claim 4 comprising:
a. said drive chain having a portion positioned in parallel relation to a plurality of said chain dogs for engaging a plurality of chain dogs.

6. A baggage system as described in claim 4 comprising
a. a second drive chain member whose movement is synchronized with said first drive chain member, said second drive chain member being positioned to operatively engage chain dog members mounted on said pallet carriers at a second location in the baggage handling system.

* * * * *